United States Patent Office 3,148,142
Patented Sept. 8, 1964

3,148,142
CLARIFICATION OF AQUEOUS SUSPENSION WITH REACTION PRODUCT OF POLYVINYL ALCOHOL, THIOUREA AND ACID
Saburo Imoto and Takehiko Igashira, Kurashiki, Japan, assignors to Kurashiki Rayon Co,. Ltd., Kurashiki-shi, Okayama Prefecture, Japan, a corporation of Japan
No Drawing. Filed Sept. 25, 1962, Ser. No. 226,146
Claims priority, application Japan Sept. 26, 1961
4 Claims. (Cl. 210—54)

This invention relates to processes for clarifying water containing solid suspended matter.

Sedimentation of the suspended matter is accomplished according to this invention by adding about 0.05 percent to about 0.5 percent by weight, based on the weight of solid material in suspension, of a reaction product of polyvinyl alcohol, thiourea or an alkyl-substituted thiourea, and a strong mineral acid, to the aqueous suspension to be clarified. Sedimentation is generally most complete when the amount of reaction product is from about 0.1 percent to about 0.25 percent by weight, based on the weight of suspended solid matter.

This invention is particularly useful in removing soil, clay, kaolinite, and the like in aqueous suspension.

The reaction product is made by reacting polyvinyl alcohol with thiourea or an alkyl-substituted thiourea in concentrated aqueous solution of a strong mineral acid. For example, a particularly desirable reaction is a reaction product of polyvinyl alcohol, thiourea and concentrated hydrochloric acid. The reaction product may be characterized as a thiouronium salt. The reaction product can be made by dissolving polyvinyl alcohol in a concentrated solution of the mineral acid, adding thiourea or an alkyl-substituted thiourea to this solution, allowing the reaction to proceed at an elevated temperature, about 110° C. for example, and then dialyzing the product. Preparation of this reaction product is known and does not constitute part of the present invention.

The equation for the formation of reaction products which are useful as sedimentation agents according to this invention may be illustrated as follows:

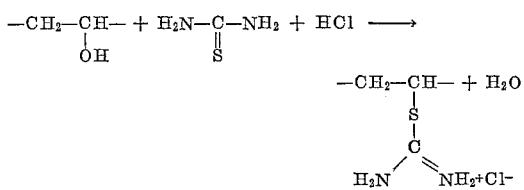

While thiourea and hydrochloric acid have been illustrated as typical of the thiourea reagent and the strong mineral acid, respectively, in the foregoing equation, it is possible to substitute an alkyl-substituted thiourea for thiourea itself, and to substitute other strong mineral acids, such as sulfuric acid, for hydrochloric acid.

The thiourea reagents which may be used in making the reaction products of this invention include not only thiourea itself but the N-alkyl-, N,N-dialkyl-, N,N'-dialkyl, N,N,N'-trialkyl-, and N,N,N',N'-tetraalkyl-substituted thiourea. These compounds have the formula

where $R_1$, $R_2$, $R_3$, and $R_4$ are selected from the group consisting of hydrogen and lower alkyl radicals. The number of carbon atoms in the lower alkyl radicals is ordinarily from 1 to about 4.

The polyvinyl alcohol reagent, which is referred to simply as polyvinyl alcohol herein, includes fully hydrolyzed polyvinyl alcohol, partially hydrolyzed polyvinyl alcohol, and copolymers of vinyl alcohol and other materials such as allyl alcohol, isopropenyl alcohol, and methyl vinyl ether in which vinyl alcohol units constitute a majority of the monomer units in the copolymer.

The following procedures are illustrative of specific methods of preparing the reaction products which may be used as sedimentation agents according to this invention:

PROCEDURE A 44 g. (equivalent to one mol of monomer) of fully hydrolyzed polyvinyl alcohol is dissolved in 210 g. of concentrated (35 percent) hydrochloric acid. To this solution is added 19 g. (0.25 mol) of thiouea. The reaction mixture is maintained at a temperature of 108 to 112° C. for eight hours, and the product is dialyzed for one week. A reaction product containing 3.93 percent by weight of nitrogen is produced.

PROCEDURE B 44 g. of polyvinyl alcohol having a degree of polymerization of 1700 is dissolved in 470 g. of concentrated (35 percent) hydrochloric acid. To this solution is added 76 g. (one mol) of thiourea. The reaction mixture is maintained at 108 to 112° C. for eight hours, and the product is dialyzed for one week. A reaction product containing 9.02 percent by weight of nitrogen is produced.

Sedimentation of solid material in aqueous suspension, using the foregoing reaction products, will now be illustrated in the following examples:

Example 1

A one percent aqueous suspension of kaolinite was adjusted to pH 6 with caustic soda. The reaction product produced by Procedure A above was added in increments to this suspension. The suspension was allowed to settle for one hour at 30° C. after each increment was added, and was then examined to determine the relative turbidity. A second suspension, similar to the first, to which nothing was added, was also observed for comparison. The turbidity of the second suspension was taken as 100, and the relative turbidity of the first suspension is defined as the amount of ratio of suspended material in the treated suspension to the amount in the untreated suspension, multiplied by 100. The relative turbidity using various percentages of reaction product, are shown in Table I below:

TABLE I

| Percent reaction product added; | Relative Turbidity |
|---|---|
| 0 | 100 |
| 0.05 | 5 |
| 0.1 | 2 |
| 0.25 | 2 |
| 0.5 | 5 |

Example 2

The procedure was the same as in Example 1, except that the reaction product prepared according to Procedure B was added to the first suspension. The relative turbidities, using various amounts of reaction product, are indicated in Table II below:

TABLE 2

| Percent reaction product added: | Relative Turbidity |
|---|---|
| 0 | 100 |
| 0.1 | 8 |
| 0.25 | 1 |
| 0.5 | 1 |

Example 3

To 25 ml. portions of an aqueous suspension containing 0.8 percent by weight of air-dried fine particles of volcanic earth less than 0.1 ml. in size, were added various quantities of the reaction product of Procedure A. These suspensions were allowed to settle at room temperature, and the sediment volumes were measured after various time intervals. The amount of reaction product, the time intervals, and the percentage of sedimentation are indicated in Table III below:

TABLE III

| Percent Reaction Product Added | Percent Sedimentation After Indicated Settling Time | | | |
|---|---|---|---|---|
| | 1 min. | 3 min. | 6 min. | 10 min. |
| 0 | 0 | 38 | 38 | 50 |
| 0.05 | 75 | 88 | 88 | 88 |
| 0.1 | 100 | 100 | 100 | 100 |
| 0.25 | 75 | 100 | 100 | 100 |
| 0.5 | 62 | 88 | 88 | 88 |

While the present invention has been illustrated with respect to specific embodiments thereof, the scope of this invention is measured only by the scope of the claims which follow.

We claim:

1. A process for clarifying water containing suspended matter which comprises adding to said water from 0.05 to 0.5 percent by weight, based on the weight of suspended matter, of a reaction product of polyvinyl alcohol, a strong mineral acid, and a compound having the formula

where $R_1$, $R_2$, $R_3$, and $R_4$ are selected from the group consisting of hydrogen and lower alkyl radicals.

2. A process according to claim 1 in which the suspended matter is kaolinite.

3. A process for clarifying water containing suspended matter which comprises adding to said water from 0.1 to 0.5 percent by weight, based on the weight of suspended matter, of a reaction product of polyvinyl alcohol, hydrochloric acid, and thiourea.

4. A process according to claim 3, in which the suspended matter is kaolinite.

References Cited in the file of this patent
UNITED STATES PATENTS 2,935,509    Paschall               May 3, 1960
3,051,691    Elizer et al.           Aug. 28, 1962